Oct. 14, 1947.    P. E. PEARSON ET AL    2,429,169
CAN BODY MAKER
Filed July 24, 1942    12 Sheets-Sheet 1
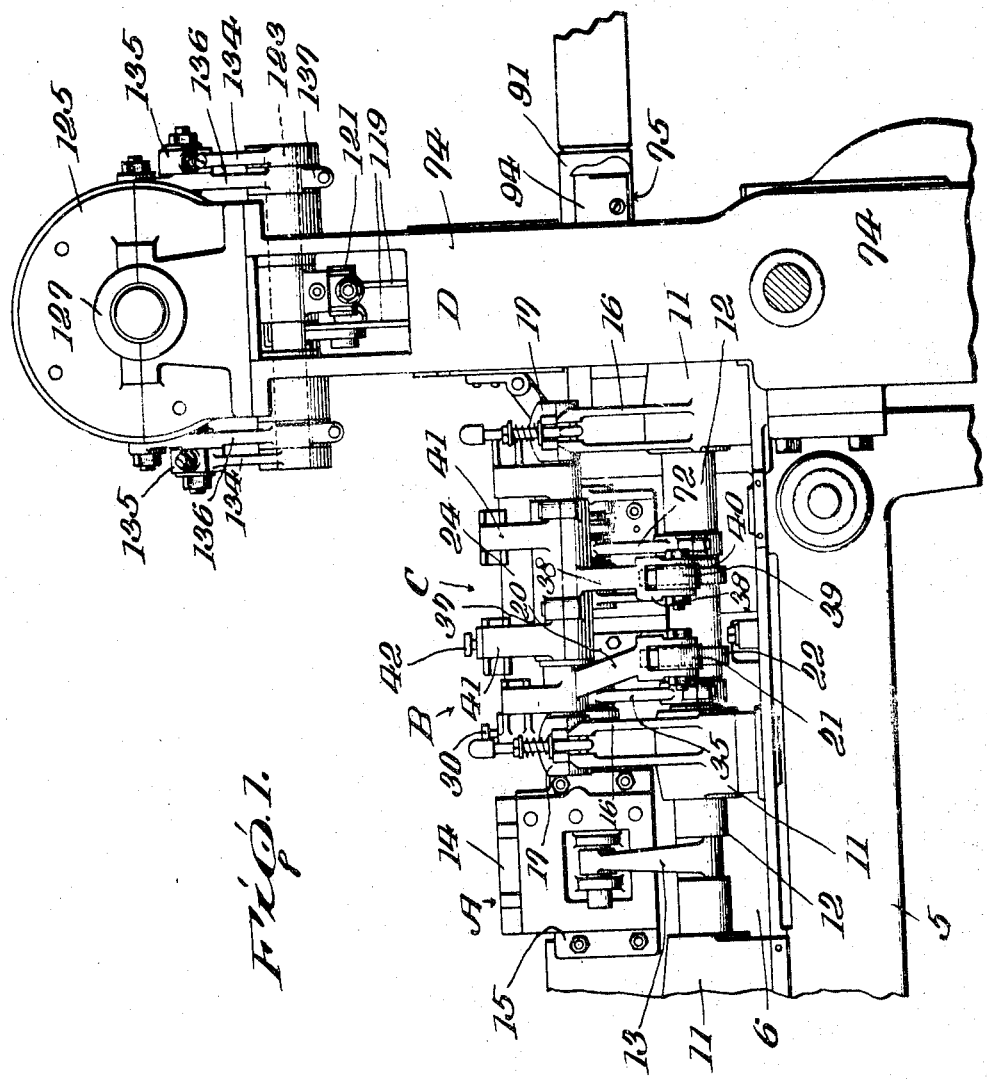
Inventors
Paul E. Pearson
Ralph M. Mero
By Mason, Porter & Diller
Attorneys

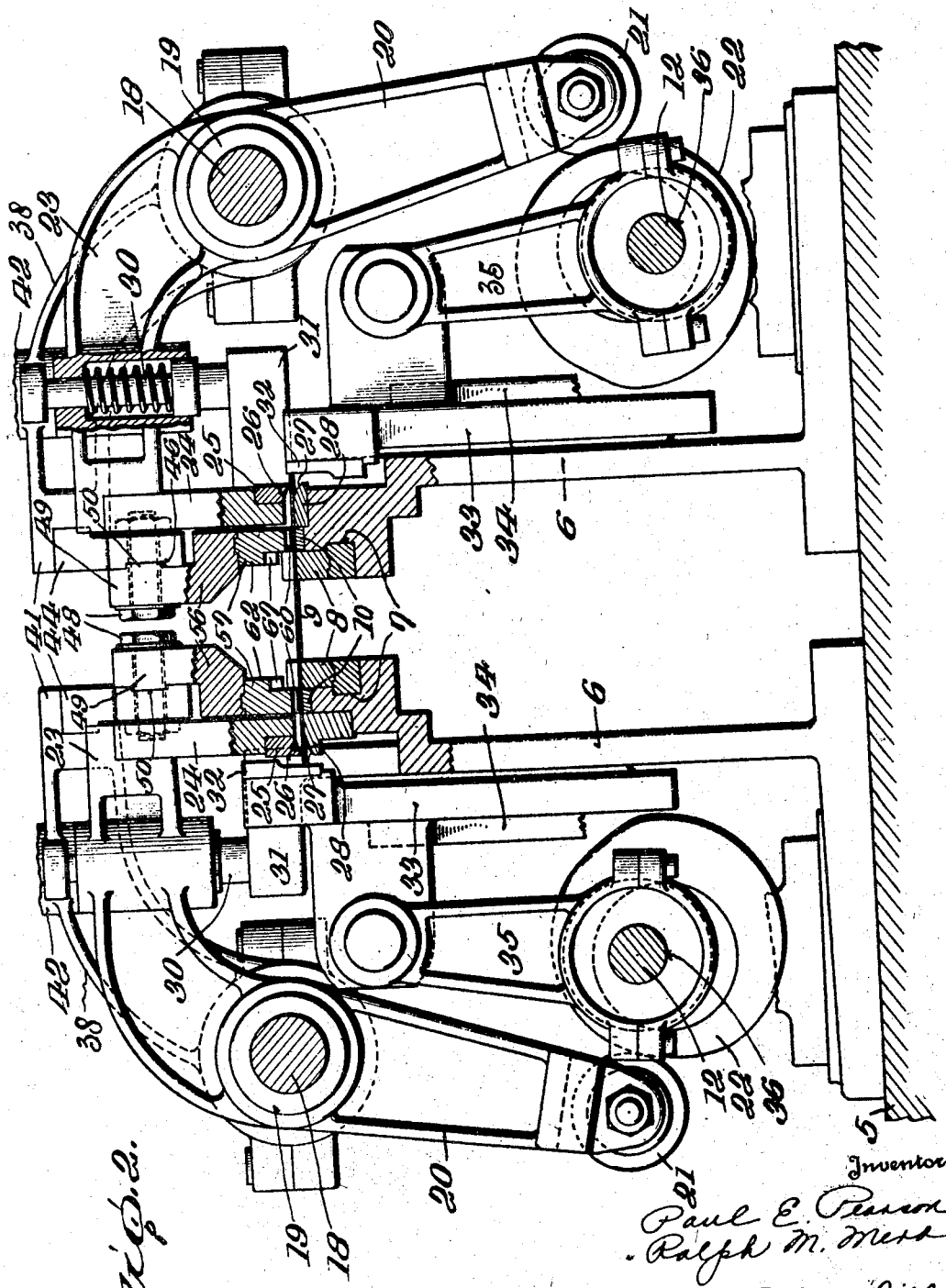

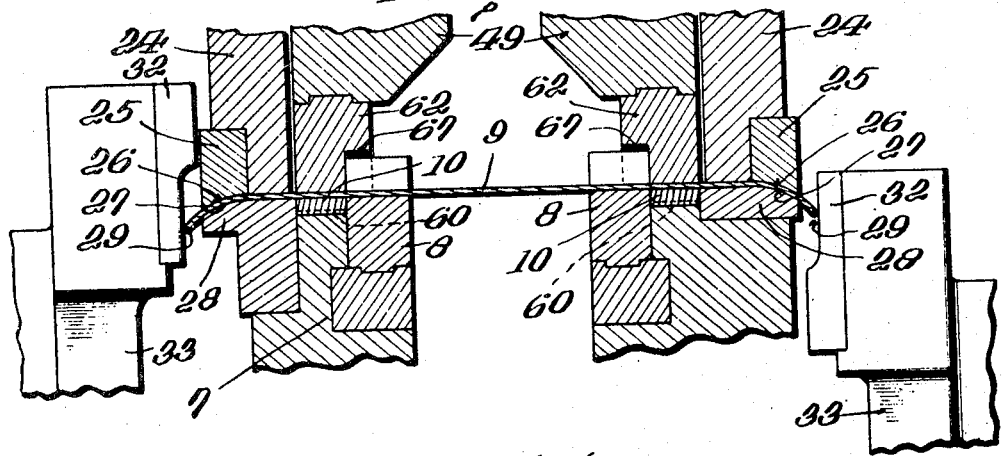
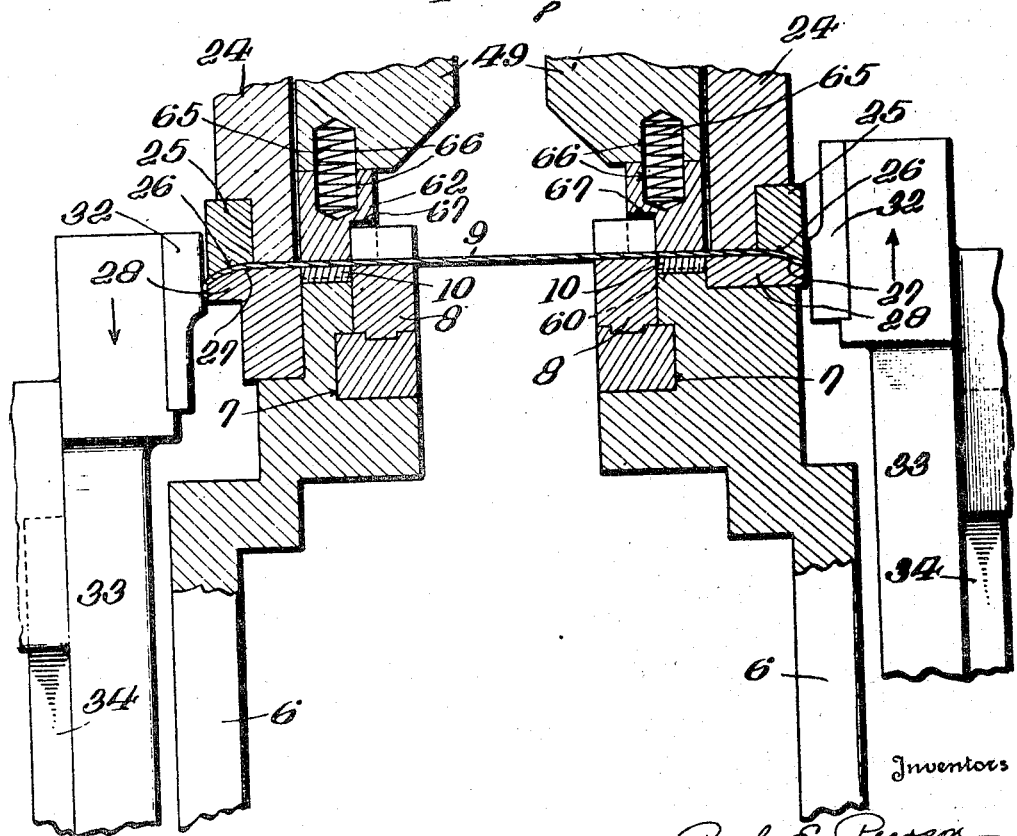

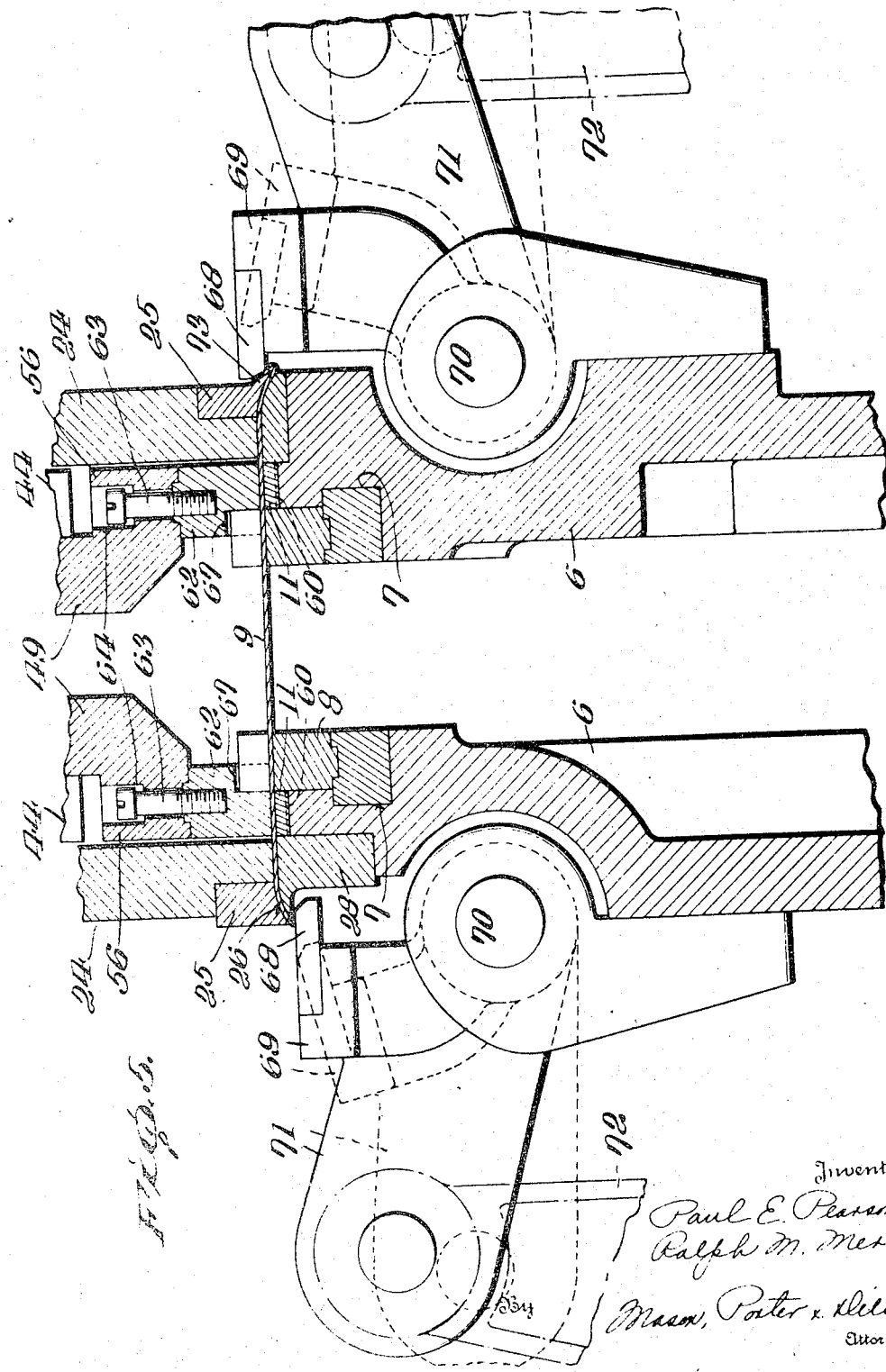

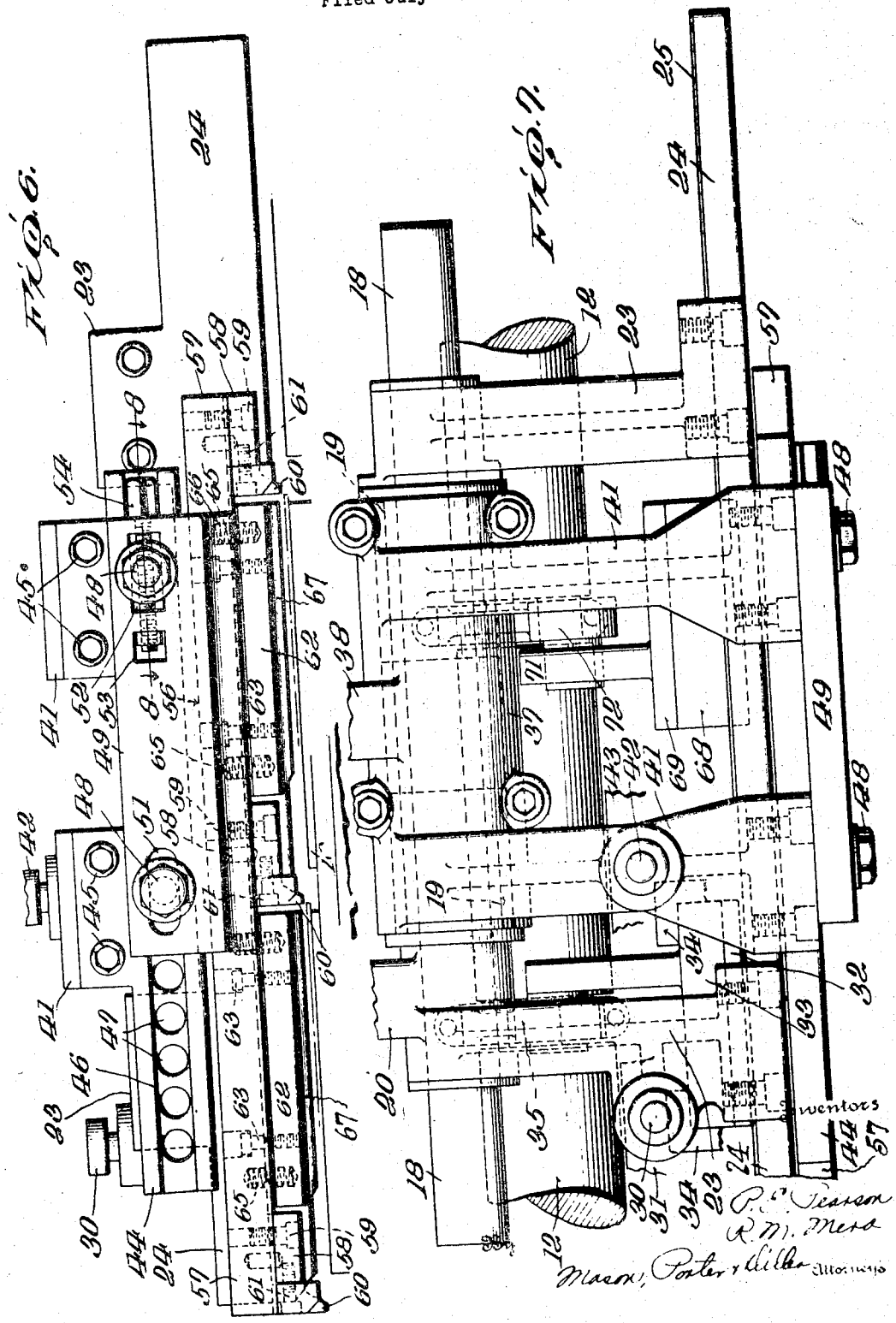

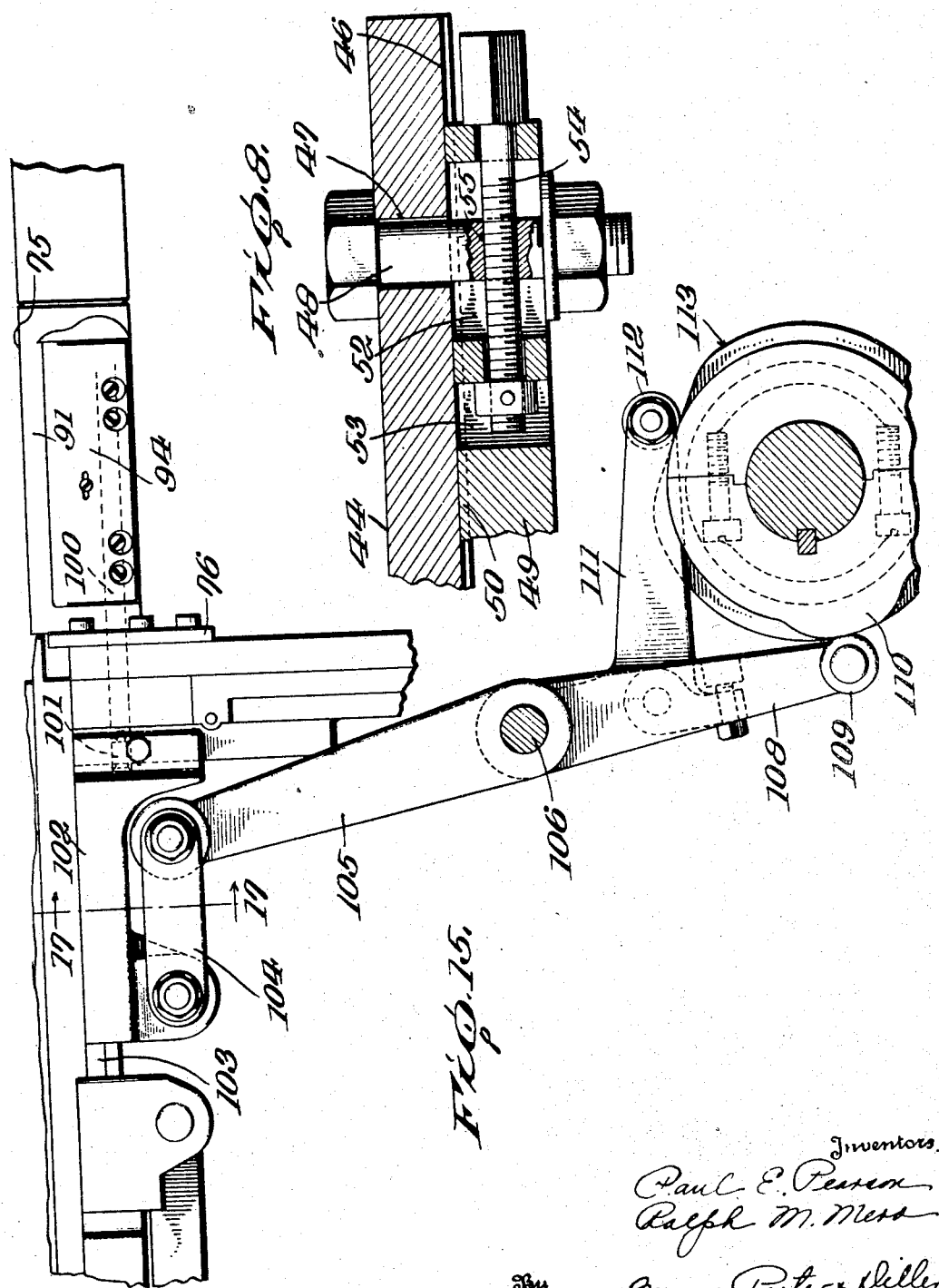

Fig. 9.

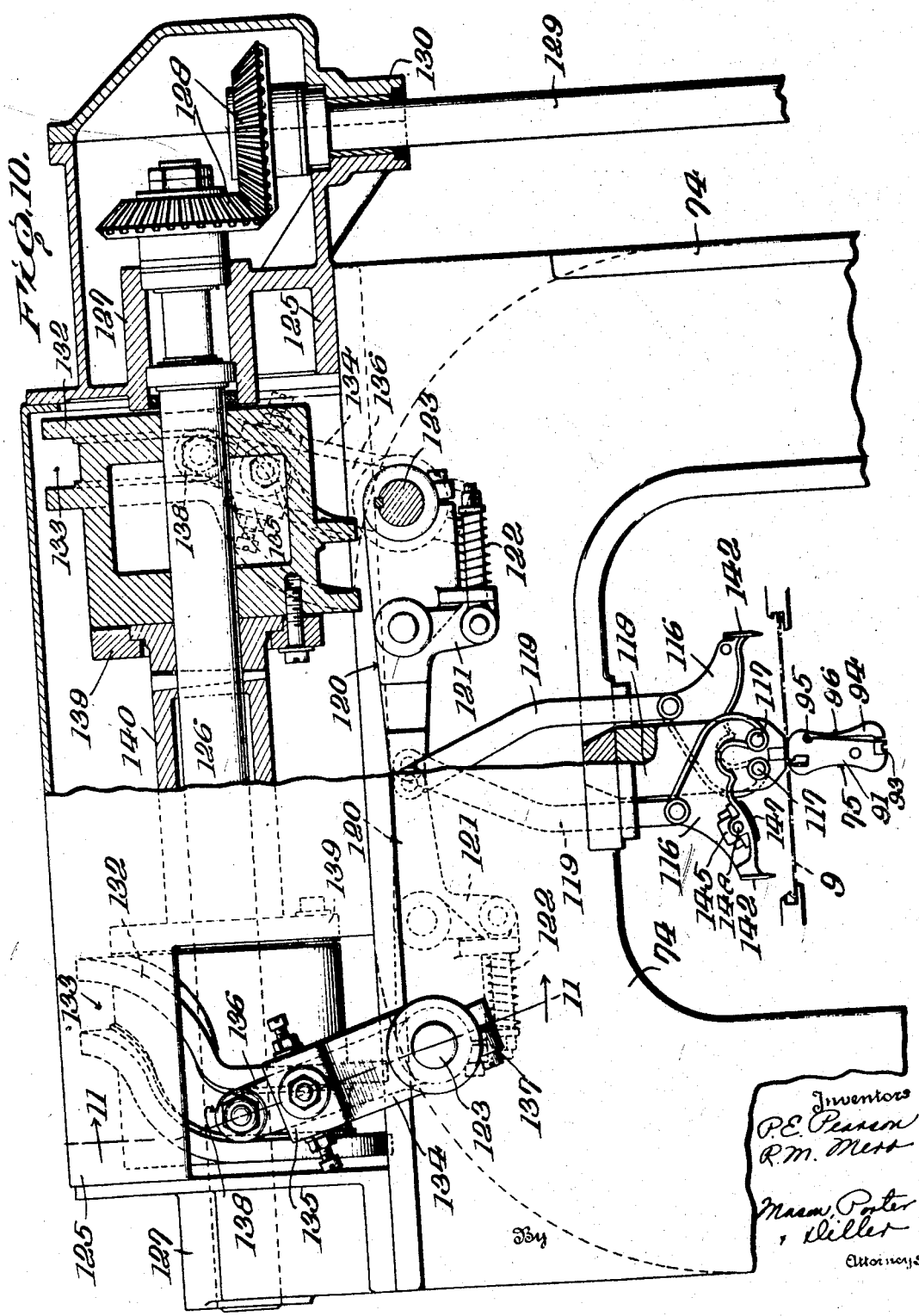

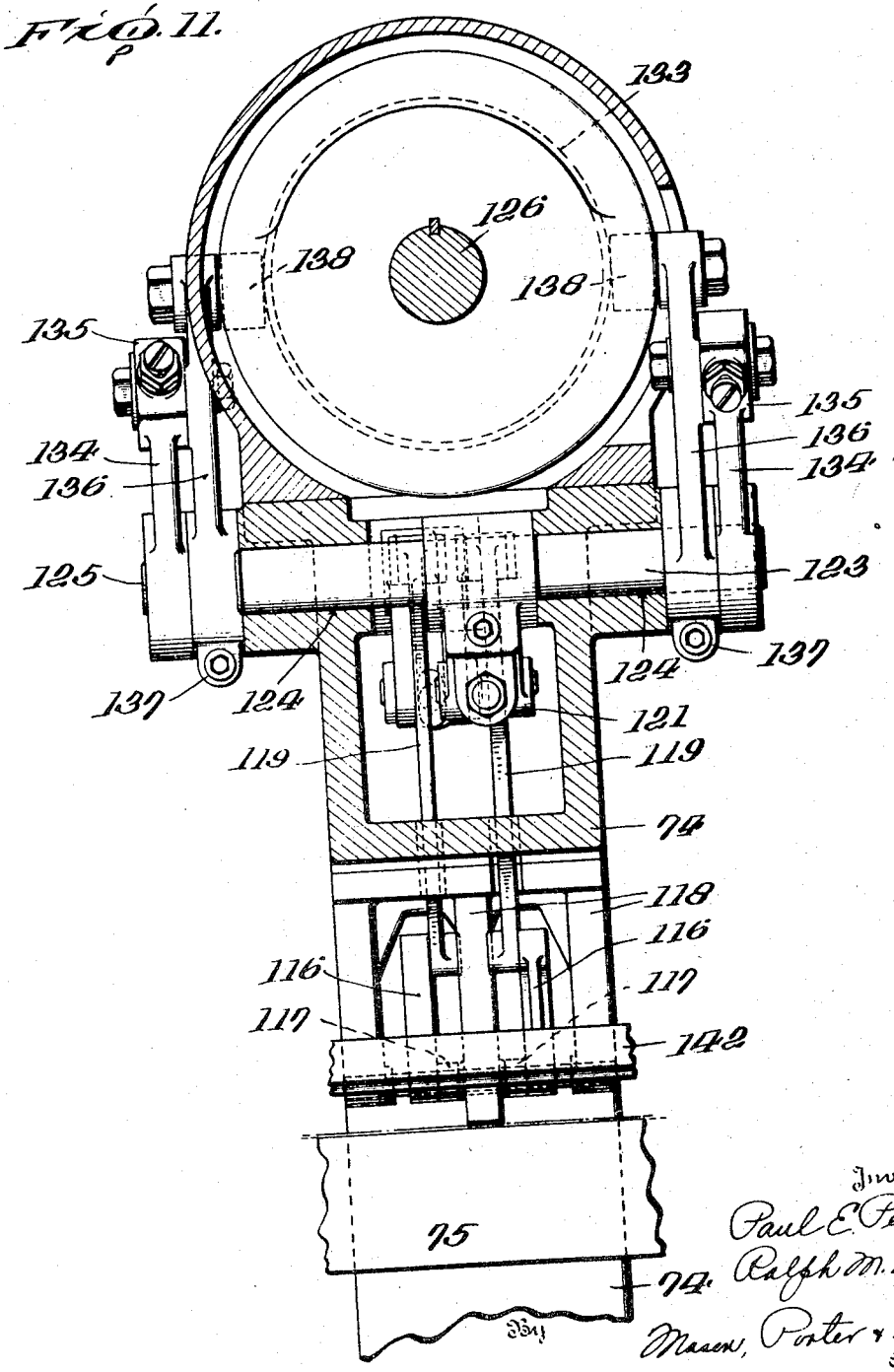

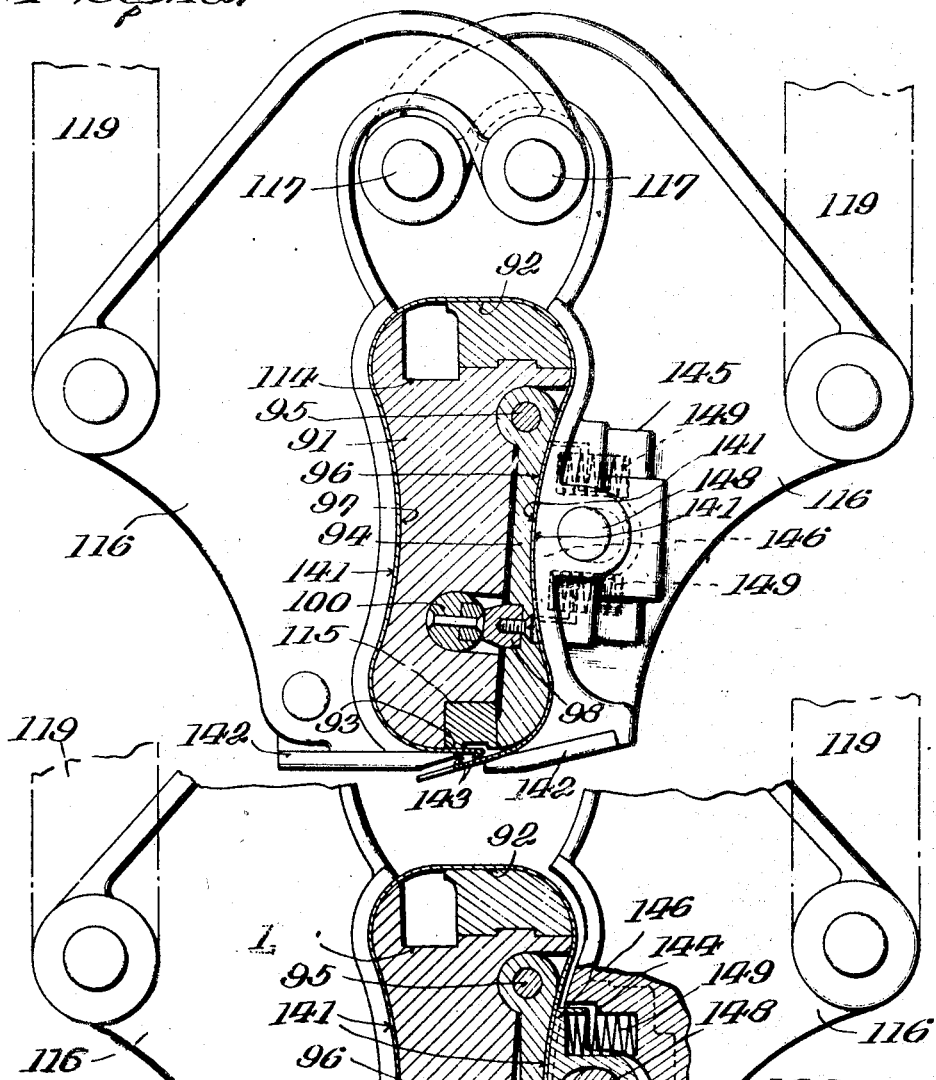
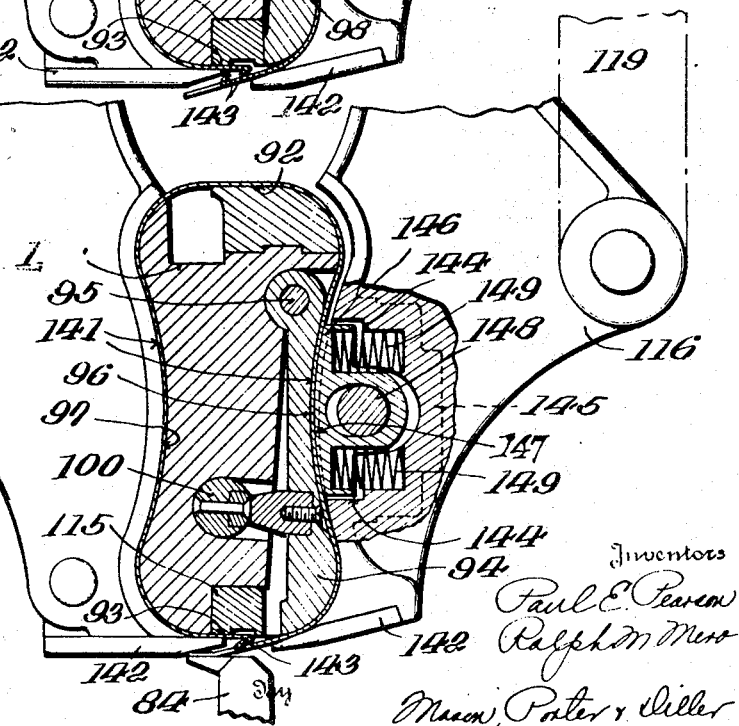

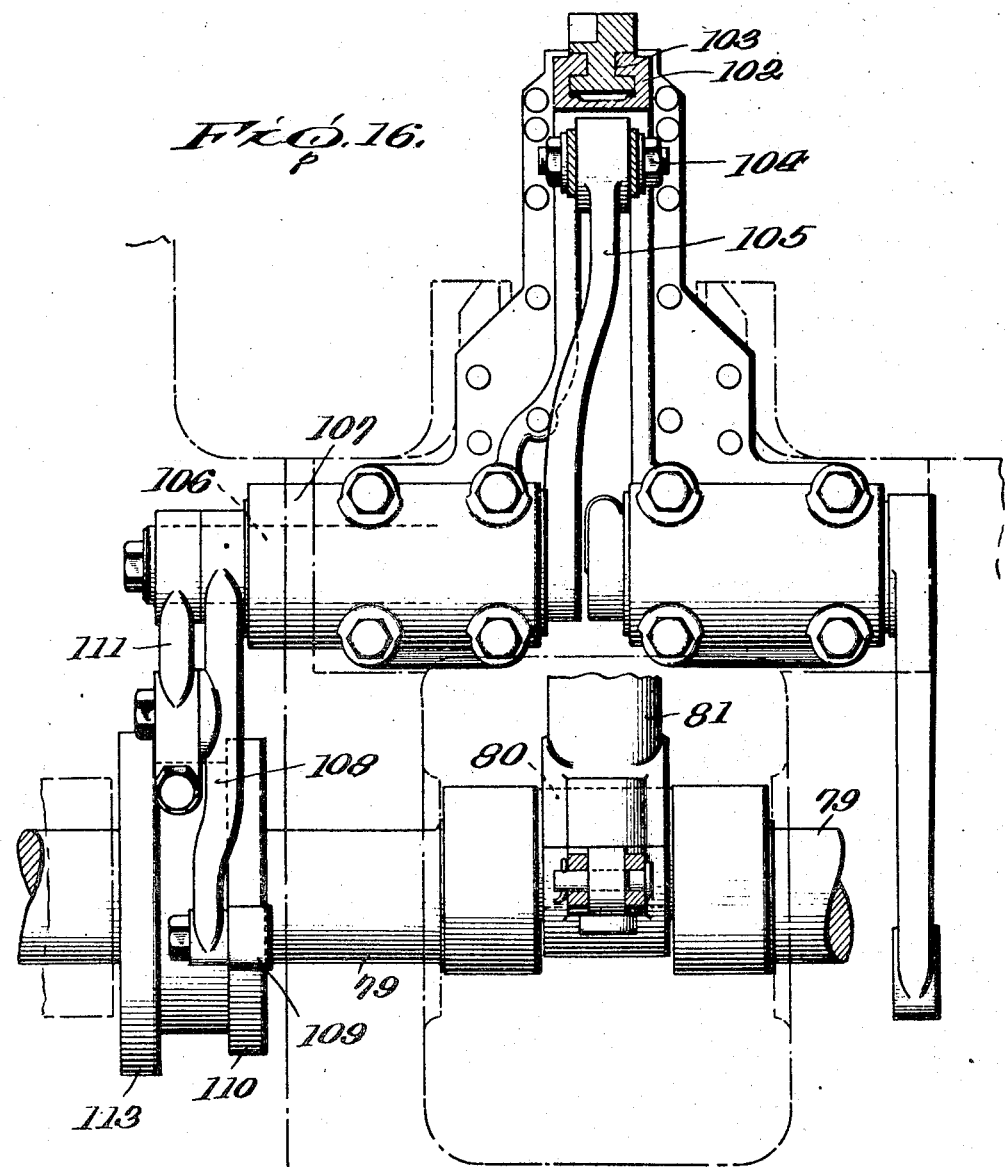

UNITED STATES PATENT OFFICE 2,429,169

CAN BODY MAKER

Paul E. Pearson and Ralph M. Mero, Chicago, Ill., assignors to Continental Can Company, Inc., New York, N. Y., a corporation of New York Application July 24, 1942, Serial No. 452,216

8 Claims. (Cl. 113—8)

The invention relates generally to the art of manufacturing metallic containers and primarily seeks to provide certain new and useful improvements in machine structure adapted for the making up of can bodies.

While not limited in practical application to any particular form of machine of the character stated, the invention is well adapted to incorporation in machines of the well known Troyer-Fox type which have developed from the structures disclosed in U. S. Letters Patent to Troyer et al., 1,772,820, issued August 12, 1930. In the type of body maker referred to, can body blanks are withdrawn one by one from a supply stack and are fed, station by station, along supporting ways, certain operations being performed thereon at the several stations. At one station the blanks are fed from a low level laterally through rolls designed to break the grain in the metal in order to facilitate the subsequent shaping or forming of the bodies and then are returned again to the supporting ways at a higher level. At another station the lateral edges of the blanks are notched and slit in a manner for facilitating the formation of the well known lock and lap seam. At another station the edge hooks which are to be interlocked in the formation of the lock and lap seam are partially formed, and at still another station the formation of these hooks is completed. The blanks are then fed to the body shaping station at which the blanks are shaped about a stub horn and the hooks thereof interlocked and bumped in the well known manner to complete the formation of the bodies; after which the soldering of the side seams thus formed is accomplished.

In machines of the character stated some difficulties have been experienced in maintaining complete control over the blanks while being fed along the supporting ways and operated upon at the various stations, and when formation of non-circular cans, that is square cans or cans with flat sides and rounded ends, has been attempted on such machines considerable difficulty has been experienced in providing the desired perfection and uniformity in shape of the can bodies. The square cans referred to are formed with well rounded corners merging into flat sides which sometimes are uniform in area throughout but more often oppose in pairs of different area so as to form generally oblong instead of truly square cans. When cans of this type are shaped about the usual horns having flat sides corresponding to the ultimately intended shape it has been found that the sides in the finished cans have a tendency to bulge out very objectionably. It has been found also that when the can body seams are formed in or adjacent to one of the rounded corners the tin plate did not bend smoothly around the forming horn adjacent to the side seam but would bend in a series of breaks so as to form a sort of washboard surface which naturally was unsightly and very undesirable. It is the purpose of this invention to remedy all of these undesirable features in machines of the character stated.

Therefore, it is an object of the present invention to provide in a machine of the character stated means for preforming or preshaping edge portions of the body blanks which are intended to lie adjacent to the can body side seams at or adjacent to a corner thereof so that the intended uniformly rounded corners of the can bodies will be provided without any washboard surface portions therein.

Another object of the invention is to provide novel means for yieldably applying pressure upon edge portions of the can body blanks while operations are being performed thereon so as to assure maintenance of complete control of the blanks and render more certainly efficient said operations.

Another object of the invention is to provide pressure applying means of the character stated including a single carrier at each side of the supporting ways over which the can bodies are fed, each of said carriers being equipped with a plurality of stops engageable by the blanks for definitely placing them at the several stations, and a plurality of yieldably mounted presser elements adapted to apply pressure to edge portions of the blanks at the several stations, means being provided for moving the carrier toward and from the ways in timed relation to the blank feeding so as to place the stops for intercepting and then at the proper time releasing the blanks and for pressing the presser elements against the blanks and then for at the proper time relieving said pressure.

Another object of the invention is to provide in a machine of the character stated a novel combination of shaping horn and cooperating shaping wings which shape the blanks about the horn and hold them while the side seams formed by interengagement of the hooked edge portions thereof are being bumped, said horn having concave side wall portions against which the blanks are pressed, and one of the sides of said horn being movable away for effecting the usual interlocking of the hooks and provided with a floatably mounted presser block which serves to tightly hold that side of the blank in concaved shape despite said movement away, thereby to provide uniformly concaved side wall partitions in the can body as it is initially formed which flatten out to the intended flat side wall shaping in the finished can body.

With the above and other objects in view that will hereinafter appear, the nature of the invention will be more fully understood by following the detailed description, the appended claims and the several views illustrated in the accompanying drawings.

In the drawings:

Figure 1 is a fragmentary side elevation illustrating a portion of a body making machine embodying the invention.

Figure 2 is an enlarged fragmentary vertical cross section taken at the station at which the preforming of the lateral edge portions of the blanks and the initial folding of the hooks is accomplished, the parts being in the positions assumed when a blank is received at the station.

Figure 3 is a fragmentary view similar to Figure 2, the parts being engaged in effecting the preforming of both lateral edge portions of the blank.

Figure 4 is a fragmentary view similar to Figure 2, the parts being positioned as having just completed the preliminary or first stage bending of the hooks.

Figure 5 is an enlarged fragmentary cross section taken at the station at which the second stage or complete bending of the hooks is accomplished, the parts being illustrated in the process of completing the bending of the hooks in full lines and the hook bending elements being shown retracted in dotted lines.

Figure 6 is a fragmentary longitudinal sectional view taken along the blank feed supporting ways and looking toward the left at the positions of the blank edge preforming and hook forming stations.

Figure 7 is a plan view of the parts shown in Figure 6.

Figure 8 is a fragmentary horizontal section taken on the line 8—8 on Figure 6.

Figure 9:
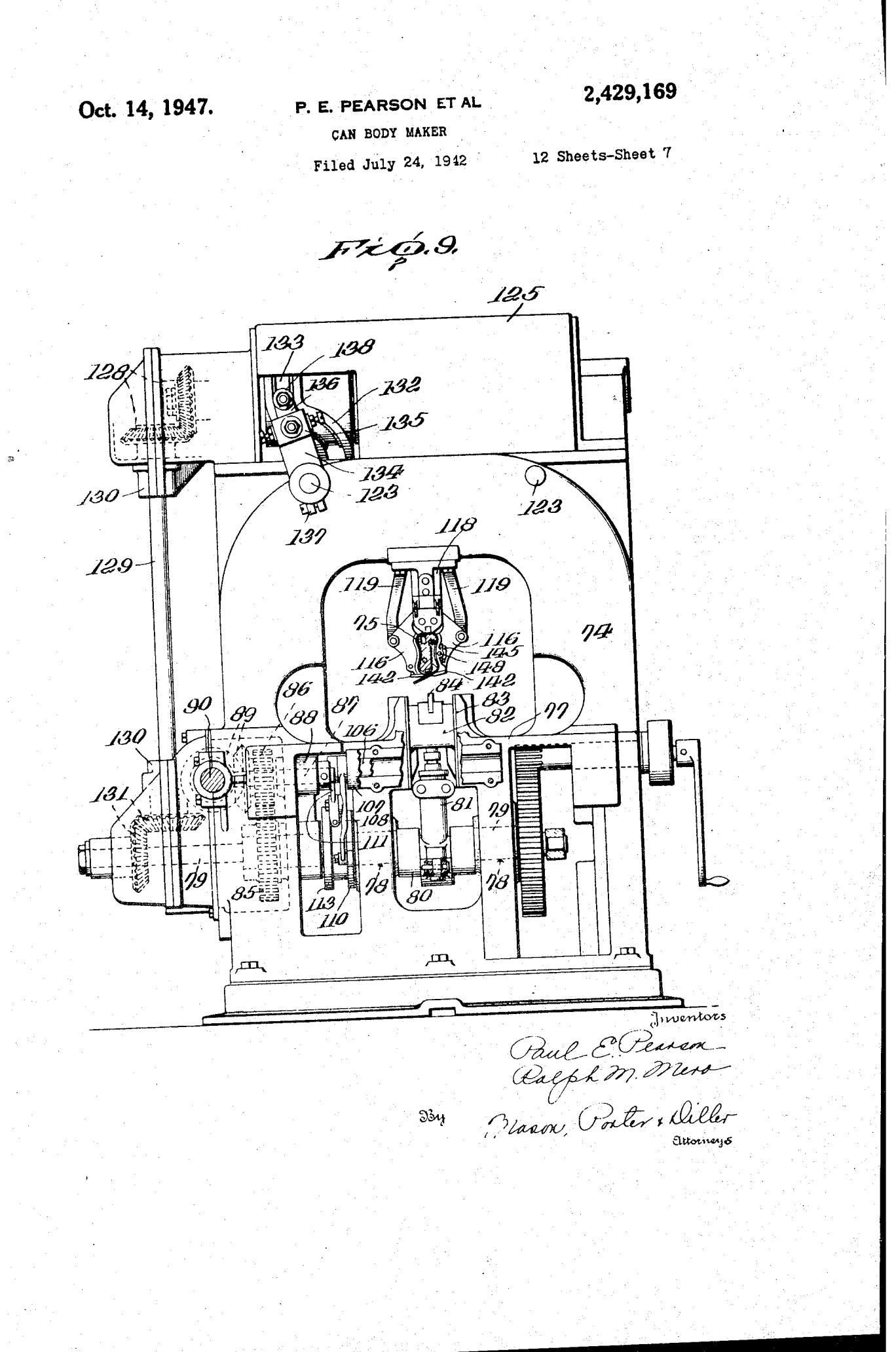

Figure 9 is a vertical cross section of a non-circular can body making machine, the section being taken at the forming station looking in the direction in which the blanks are fed, a non-circular horn placed for forming can bodies having their side seams disposed centrally between two horn corners being shown, and the forming wings being shown closed.

Figure 10 is an enlarged face view and part longitudinal section illustrating parts shown in Figure 9, the forming wing actuating devices looking in a direction opposite that in which the blanks are fed, the forming wings being shown open.

Figure 11 is a vertical cross section taken on the line 11—11 on Figure 10.

Figure 12 is an enlarged detail vertical cross section showing the horn of Figures 9 and 10 in its collapsed condition.

Figure 13 is a view similar to Figure 12 showing the expanded condition of the horn, the floatably mounted presser being shown as maintaining contact of the body blank against the concave face of the horn.

Figure 15 is a fragmentary vertical longitudinal section illustrating the horn expander pin actuating devices.

Figure 16 is a fragmentary vertical cross sectional view illustrating the devices shown in Figure 15 and looking in the direction in which the blanks are fed.

Figure 14:
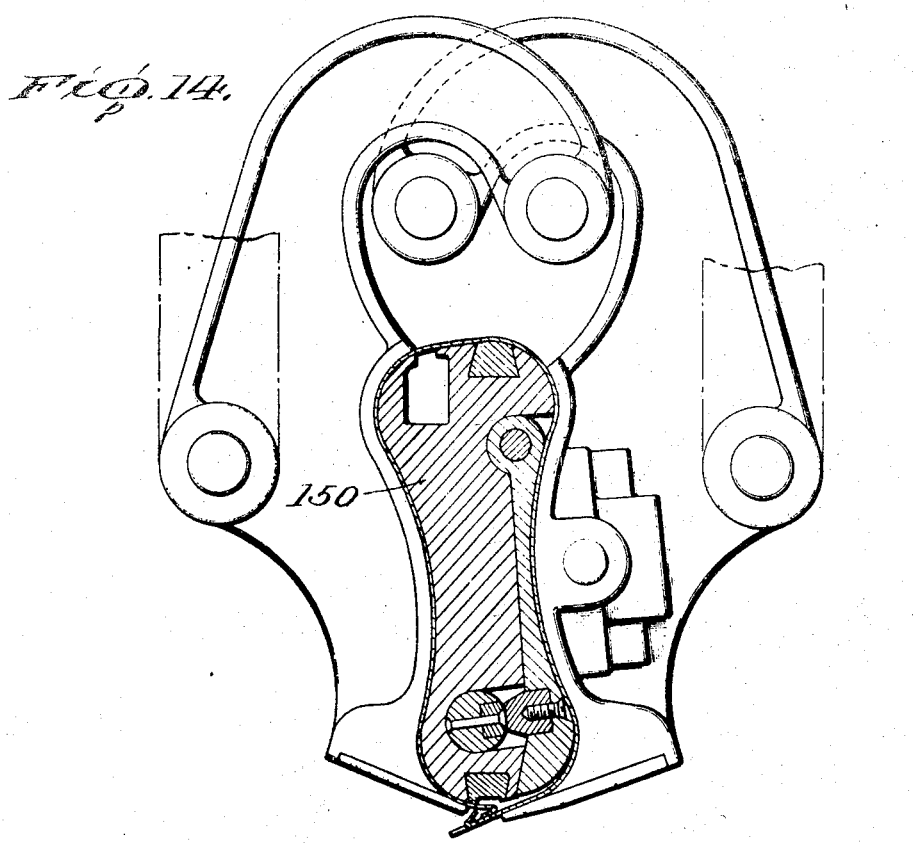
Figure 14 is a view similar to Figure 13 showing a modified arrangement of horn in which the seam position is disposed to one side of the center.

In the example of embodiment of the invention herein disclosed the invention is illustrated as embodied in a machine of the well known Troyer-Fox type hereinbefore referred to. Only a few of the stations employed in such machines are herein illustrated, namely the notching station A, see Figure 1, the first preforming and prefolding station B, see also Figures 2, 3, and 4, the second preforming and folding or hook forming station C, see also Figure 5, and the body forming station D, see also Figures 9, 10, 12, 13, 15, 16, and 17.

The machine structure herein illustrated includes a bed frame 5 on which the usual side housings 6 are supported in laterally spaced, parallel relation as indicated in Figures 1 and 2 of the drawings.

The side housings are equipped with the usual guideways 7 in which conventional reciprocatory feeder bars 8 are mounted, said feeders being reciprocated in the usual manner, by means not shown, for moving the body blanks 9 over the supporting tracks or rails 10, station by station.

In suitable bearings 11 disposed along the bed frame 5 outwardly of each of the side housings 6 there is mounted a presser, notching and folding means driving cam shaft 12. The rotatably mounted cam shafts are driven in timed relation with the other operating parts of the machine by conventional means not shown.

Each of the cam shafts 12 includes an eccentric portion which is embraced by a strap and pitman connection 13 which serves to transmit the rotary motion of the respective cam shaft in the form of reciprocatory movement to a notching slide 14 which is slide guided as at 15 on the respective side housing 6.

The two of the bearings 11 at each side of the machine between which the stations B and C are located are provided with upward extensions 16 providing bearing as at 17 for a supporting shaft 18. Each of the supporting shafts 18 is surrounded by a rocker sleeve 19 having a single actuator crank 20 depending therefrom in the manner clearly illustrated in Figures 1 and 2 of the drawings. Each of the crank arms 20 is provided with a roller 21 at its lower extremity which engages an actuator cam 22 secured upon the respective cam shaft 12. Each sleeve 19 also is equipped with a longitudinally spaced pair of supporting crank arms 23, and each pair of arms 23 has a former bar 24 removably secured to the inner ends thereof in the manner best illustrated in Figures 1, 2, 6, and 7 of the drawings.

Each former bar 24 carries a removably and replaceably mounted preforming steel 25 at the lower edge thereof, said steel having its undersurface 26 concaved in a manner for properly preforming one of the lateral edge portions of a blank placed at either of the preforming stations, and the effective, concavely curved undersurface 26 of each steel serves to preform the underlying edge portion of a can body blank in a manner indicated at 27 in Figure 3 of the drawings by pressing said edge portion against a cooperating underlying steel 28 which is convexly formed in the manner clearly illustrated in said Figure 3. It will be observed by reference to Figure 3 that in the operation of preforming the lateral edge portions of the blanks, the edge extremities of the blanks are left exposed beyond the complementary preforming steels 25, 28 in the manner indicated at 29 in Figure 3.

A spring plunger 30 is provided on one of each pair of arms 23 and is engageable with an extension 31 from the respective side housing 6 so as to be effective to constantly hold the respective roller 21 in engagement with the respective actuator cam 22. See Figures 2, 6 and 7 of the drawings.

While at the first preforming and prefolding station B illustrated in Figures 2, 3, and 4 of the drawings, the extended edge portions 29 of the blanks are initially folded from the initially preformed condition illustrated in Figure 3 to the initial fold or prefolded condition illustrated in Figure 4. This is accomplished by folder steels 32 which are removably and replaceably mounted on reversely reciprocable slides 33. Each slide is vertically guided as at 34 on the respective side housing 6 and is strap and pitman connected as at 35 to an actuating eccentric 36 provided on the cam shaft 12 in the manner clearly illustrated in Figures 1 and 2 of the drawings. It will be obvious by reference to Figure 4 of the drawings that as one of the steels 32 moves upwardly the other steel 32 will move downwardly to effect the initial folding of the lateral edge extremities of the body blanks in the manner illustrated in Figure 4.

Novel means is provided for stopping the body blanks at the respective stations A, B, and C, and novel means also is provided for applying yieldable pressure to the body blanks during the preforming and prefolding thereof so as to render these operations as accurate and efficient as possible. These novel stop and pressure applying equipments will now be described, and attention is directed to Figures 1 and 2 through 7 of the drawings.

A sleeve 37 is rockably mounted about each sleeve 19 and is equipped with a depending actuator crank arm 38. Like the crank arms 20, the arms 38 are equipped with rollers 39 at the lower ends, and these rollers engage actuating cams 40 mounted on the cam shafts 12 in the manner clearly illustrated in Figure 1 of the drawings. Each sleeve 37 also is provided with a pair of supporting crank arms 41, one of which is equipped with a spring plunger 42 engageable with a side housing extension 43 for the purpose of constantly holding the respective roller 39 against the respective cam 40.

A carrier bar 44 is removably secured as at 45 to the innermost ends of each pair of arms 41, each said bar being provided with a face groove 46 and a plurality of selective, threaded apertures 47 extending therethrough and through said groove. The apertures are designed to receive securing bolts 48 by which a mounting bar 49 is removably, adjustably secured to each bar 44, each said mounting bar 49 having a rib 50 designed to engage in the respective face groove 46. Each mounting bar is equipped with a longitudinal slot 51 at one end and is slotted as at 52 and recessed as at 53 to accommodate an adjuster screw 54 which is threaded through the respective securing bolt 48, as at 55, in the manner best illustrated in Figures 6 and 8 of the drawings. It will be obvious that by loosening the securing bolts 48 and turning the captive screw 54, longitudinal movement of adjustment can be imparted to the respective mounting bar 49, after which the bolts 48 can again be tightened to secure the adjustment of the mounting bar.

Each mounting bar 49 includes an outward offset 56 and end extensions 57 from said offset, and it will be apparent by reference to Figures 2, 6, and 7 of the drawings that the offset end extension portions 56, 57 are disposed directly beneath the carrier bar 44 at the respective side of the machine.

It will be observed by reference to Figure 6 of the drawings that three stop mounting blocks 58 are secured as at 59 to the undersurface of the respective mounting bar offset or extension portion 56, 57, and that a blank stop member 60 is removably secured as at 61 to the end of each mounting block toward which the can body blanks are fed. The stops 60 are disposed at the notching station A, the first preforming and prefolding station B, and at the preforming and folding station C for the purpose of accurately stopping the can body blanks at said stations. It will be obvious that as the carrier bar 44 is vertically oscillated the stops 60 will be alternately lowered into position for intercepting and stopping the can body blanks and then lifted out of the way so as to permit the blanks to be properly fed by the synchronized reciprocatory feeding means 8. The supporting tracks or rails 10 over which the can body blanks are intermittently fed are suitably recessed as indicated in Figure 6 in order to permit this vertical reciprocation or placement and retraction of the stops 60.

In order to apply pressure to the can body blanks and thereby control them during the various operations thereon, a presser bar 62 is supported by each carrier bar 44 at each of the two preforming stations B and C over which said bar extends. Each of the presser bars 62 is mounted for limited independent vertical movement relative to the respective overlying mounting bar offset or extension portion 56, 57 on headed screws 63 which are threadably attached to the presser bars and extend into counterbored apertures 64 in the respective mounting bar in the manner best illustrated in Figures 5 and 6 of the drawings. The presser bars are yieldably urged downwardly by compression springs 65 which are interposed between the presser bars and the overlying portions 56 or 57 of the respective mounting bar 49 in aligned sockets 66. The presser bars are equipped with side recesses 67 for accommodating the necessary movement of the reciprocatory feeders 8. See Figures 2 through 6 of the drawings.

At the second preforming and folding station C the lateral edge extremities of the can body blanks are given their final folding in order to form the hooks which are to interlock in the formation of the can body side seams. See Figures 1, 5, and 7 of the drawings. The final folding or hook formation is effected by folder steels 68 which are removably and replaceably mounted on crank arms 69. The arms 69 are rockably mounted as at 70 on the respective side housings in the manner clearly illustrated in Figures 1 and 5 of the drawings and have crank extensions 71 which are strap and pitman connected as at 72 to actuating eccentrics provided on the cam shafts 12. It will be observed by reference to Figure 5 that the steel 68 shown at the left in that figure serves to fold the respective can body blank edge portion under the opposing bottom forming steel 28, whereas the folder steel 68 at the opposite side of the machine folds the respective can body blank edge extremity upwardly against a lateral extension 73 from the upper preforming steel 25 at that side of the machine.

At the main can body shaping or forming station D the machine includes the usual arch frame 74 in the manner clearly illustrated in Figures 1, 9, 10, and 11 of the drawings. Beneath this arch is mounted the forming horn, generally designated 75, about which the can bodies are formed in the manner clearly illustrated in Figures 10, 12, and 13 of the drawings. The horn 75 is flange-secured as at 76 on a frame piece which is in turn supported by the cross portion 77 of the frame. See Figures 9 and 15 through 17.

The cross frame also is equipped with bearings 78 for rotatably supporting a transversely disposed actuator shaft 79 which includes a crank portion 80 connected by a pitman 81 with the bumper slide 82 which is slide guided as at 83 in the cross frame and carries the usual bumper steel 84 in position for opposing the undersurface of the horn against which the can body side seams are formed and bumped.

The shaft 79 has a gear 85 affixed thereon to which rotation is imparted by a gear 86 mounted on a stub shaft 87 which is rotatable in a frame bearing 88 and which is in turn driven through the bevel gear couple 89 from the power shaft 90 to which rotation is imparted in any approved manner not shown.

The machine structures herein disclosed are adapted for forming can bodies which are generally rectangular in cross section with well rounded corners, but it is to be understood that the features of the invention apply as well to the formation of square cans with well rounded corner portions, or to cans which have parallel flat major area sides and end portions which are rounded throughout and include no flat wall portions. The invention also comprehends various placements of the horn and preforming devices so that the can body side seams can be formed centrally of one minor area side of the can body in the manner illustrated in Figures 9, 10, 12, and 13, to one side of the center, as indicated in Figure 14, or in other selected positions.

In the main example illustrating the horn 75, it is generally rectangular, as stated, and includes a solid body 91 having a flat top 92, a flat bottom portion 93, and a collapsible side wing 94 hingedly mounted on the solid body as at 95. See Figures 9, 12, and 13. The collapsible wing 94 is provided with a concave side wall 96 corresponding in curvature to the opposite side wall 97 formed on the solid body portion 91. By forming the sides of the can bodies against these concave side wall portions, the formation of the can bodies is completed with the major side walls of the can bodies pressed inwardly, and after the completion of the can bodies these inwardly displaced can body side portions spring out into the intended parallel flat relation instead of objectionably bulging outwardly as when formed by conventional equipments wherein the side walls of the horn against which the can body side walls are formed are flat after the usual practice in can body making.

Figure 17:
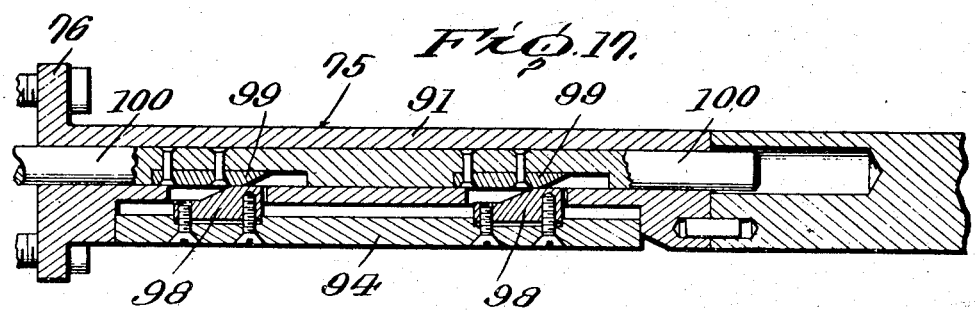
Figure 17 is a horizontal section taken through the horn at the level of the expander pin.

It will be observed by reference to Figures 13 and 17 of the drawings that the horn wing 94 has a pair of cams 98 affixed to the inner surface thereof, and these cams are engageable by cams 99 secured to an expander rod 100 which is longitudinally reciprocable in a bore in the horn in the manner clearly illustrated in Figures 9, 12, 13, and 17. It will be obvious that each time the expander rod 100 is moved into the horn, or to the right as viewed in Figure 17, the cam equipments 99, 98 will co-act to force the collapsible side wing 94 to the extended position illustrated in Figure 13, whereas each time the rod is moved in the opposite direction, or retracted, the cams 99 will move away from the cams 98 and permit the side wing 94 to collapse to the position illustrated in Figure 12.

In order to impart the desired reciprocation to the expander rod 100 in properly timed relation to the other operating parts of the machine, the end of the rod 100 which extends from the horn 75 is vertically crank adjustably secured, as at 101, to a cross head 102, said cross head being slide guided as at 103 and link connected as at 104 to the upper end of an actuator lever 105. See Figures 9, 15 and 16. The lever 105 is secured to a rock shaft 106 which is rockably mounted as at 107 on the cross frame 77. The shaft 106 also has a rod advancing arm 108 secured thereon and equipped with a roller 109 engaged with an advancing cam 110 secured on the cross shaft 79. A retracting arm 111 also secured on the rock shaft 106, and this arm is equipped with a roller 112 engaged with a retracting cam 113 mounted on the shaft 79. It will be obvious that as the cross shaft 79 is rotated its rotary movement will be transmitted through the cam and lever connections 110, 113, 108, 111 and 105 in the form of positive reciprocatory movement to the expander rod 100.

The horn is provided with a feeder bar slideway 114, and with a replaceable filler or anvil 115 disposed to cooperate with the bumper steel 84 in the usual manner.

The can body blanks which have had their edge portions preformed in the manner clearly illustrated in Figures 2 through 5 of the drawings or otherwise according to the particular form of horn in use are fed one by one over the forming horn 75 and are formed or shaped about that horn by folder wings 116 which are pivoted at 117 to the supporting bracket 118 depending from the arch frame 74 in the manner clearly illustrated in Figures 9, 10, and 11 of the drawings.

Actuator links 119 are attached at their lower ends to the folder wings 116, and each link is connected at its upper end to a crank arm 120 formed of two sections pivotally connected by a knee joint 121, means 122 being provided for yieldably holding the crank arms in a normal extended position illustrated in Figure 10 of the drawings. It will be obvious that by swinging the crank arms 120 downwardly from the position illustrated in Figure 10, the folder wings 116 can be swung downwardly in a manner for forming a can body blank about the horn 75. Should any obstruction to the normal formation of a can body be presented, the component parts of one or both crank arms 120 would be permitted to move relatively by the yielding means 122 so as to prevent breakage of parts.

In order to impart the desired oscillation to the crank arms 120 in timed relation to the other operating parts of the machine, each crank arm 120 is secured to a shaft 123 rockably mounted as at 124 in the arch frame 74. A housing 125 is mounted upon the arch frame, and a crank arm operating shaft 126 is rotatably mounted therein in bearings 127. The shaft 126 is driven by a bevel gear couple 128 from a vertically disposed drive shaft 129 which is rotatable in bearings 130 and is driven through the bevel gear couple 131 from the cross shaft 79. Two rotary cams 132 are mounted on the shaft 126, one thereof being provided for imparting oscillatory movement to each of the crank arms 120. Each cam 132 has an actuator groove 133.

An actuator lever 134 is fixed to each of the rock shafts 123, one said lever being disposed on one side of the housing 125 and the other at the opposite side of said housing. Each lever 134 is adjustably connected as at 135 to a companion actuator lever 136 disposed beside the respective lever 134 and adjustably clamped as at 137 to the respective rock shaft 123. Each lever 136 carries a roller 138 which engages in the adjacent cam groove 133.

Each cam 132 is adjustably clamped as at 139 to one end of a driver sleeve 140 which is pinned or otherwise secured to the shaft 126. See Figure 10. It will be obvious that the adjustable mounting of the cams 132 and the equipments 135 and 137 which enable adjustment of the angular relation of the levers 134, 136 makes it possible to vary the position and timing of the folder wings 116 and the actuating devices associated therewith. See Figures 1, 10, and 11.

Each of the forming or shaping wings 116 includes a convex surface conforming in shape to the external, concave surface 96 or 97 of the horn which it opposes, and each wing includes an extension plate 142 effective to place the blank hooks 143 in proper cooperative relation. See Figures 12 and 13.

The wing 116 which opposes the collapsible wing 94 of the horn is provided with a longitudinal recess 144 formed in an enlargement boss 145 on said wing. A presser bar 146 is provided having a convex inner surface 147 conforming in shape with the wing 141 and the horn 94 which it opposes, and the bar is floatably mounted as at 148 in the recess 144. The bar is backed by compression springs 149 interposed between it and the enlargement boss 145, and these springs serve to yieldably urge the bar toward the horn within the limit of movement permitted by the floatable mounting of the bar.

In the initial swinging downward of the shaping or forming wings 116, from the position illustrated in Figure 10, the can body blank 9 is shaped about the horn with its major area side wall portions concaved inwardly in the manner illustrated in Figure 12 and with the hooks 143 overlapping by reason of the fact that the hingedly mounted horn side wing 94 is at this time collapsed.

With the parts in this position the expander rod 100 is moved in to expand the horn side wing 94 to the position illustrated in Figure 13, thus causing the hooks 143 to interengage. It should be understood that the parts are so timed that the wing 116 at the right in Figures 12 and 13 moves down to the position illustrated in said figures and starts back immediately, and at this point the horn starts to expand, that is, the collapsible wing 94 starts to move from the position illustrated in Figure 12 to the position illustrated in Figure 13. When the wing 94 is expanded the wing at the left in Figures 12 and 13 remains stationary and the bumper steel 84 is forced against the interengaged hooks 143 to set the seam.

Since the wing 116 at the right in Figures 12 and 13, oscillates about a different center than the horn wing 94, the close conforming shape relation between the wing and horn surfaces 141 and 96 will be destroyed in the manner clearly illustrated in Figure 13, and without provision of means to offset this condition, the final shaping of the can body would be destroyed. However, by reason of the provision of the floatably mounted, spring pressed bar 146, the can body side wall portion illustrated at the right hand side in Figures 12 and 13 is held snugly against the opposing surface 96 of the horn wing 94 and the desired shaping of the can body side wall is maintained. Simultaneously with the bumping of the side seam, as aforesaid, the folder wings 116 are started back to their original positions illustrated in Figure 10 and the formed can body is fed along the horn toward the soldering station, assuming, of course, that the machine is one in which the can body is completed by a soldering operation.

In the operation of the machine, the can body blanks are fed over the rails 10 station-by-station in the manner previously described. The parts are timed so that while the feed bars 8 are advancing, the stops 60 are lowered to intercept and accurately stop the blanks at the stations A, B, and C. A blank disposed at station B in the manner indicated in Figure 2 will have its lateral edge portions first preformed in the manner indicated in Figure 3 by the lowering of the preforming steels 25 properly shaped in accordance with the form of horn in use, and then will be given their initial folding by reverse movement of the folder steels 32 in the manner illustrated in Figure 4.

A blank at station C will be given an additional preforming pressure by lowering of the preforming steels 25, and the final folding or hook forming step is accomplished at this station by inward movement of the folding steels 68 in the manner hereinbefore described.

The spring loaded shoes or presser bars 62 serve two purposes. First, they exert a continual pressure on the body blank to help control the operations thereon, and second, they hold the body blank down as the hooks are formed by the folding steels so that the blanks will be certain to clear the stops 60 as the body blanks are advanced.

The preformed and hooked blanks advanced one by one to the forming station D are formed into can bodies in the manner hereinbefore described.

It is, of course, to be understood that the details of structure and the arrangement of parts may be variously changed and modified without departing from the spirit and scope of the invention.

We claim:

1. In a body maker, a horn generally rectangular in cross section and having concave side walls, one said side wall being swingably mounted to permit expanding and collapsing of the horn, means for feeding to the horn body blanks having hooks at edge portions thereof adapted for interengagement in the formation of side seams, swingably mounted folder wings, means for operating said wings in timed relation for folding blanks about the horn to shape the can bodies and place the hooks in overlapped relation, said wings having convex face portions conforming in shape to and opposing the concave side walls of the horn, means for moving the swingably mounted wall while the hooks are overlapped to expand the horn and cause the hooks to interengage and form a side seam, means for bumping said seam, said wing operating means being timed to move one said wing away from the horn just prior to engagement of the bumping means with the seam while maintaining the other wing in contact, and means for holding the blank pressed against the side of the horn at that side at which said one wing is moved away while the seam bumping is being performed.

2. In a body maker, a horn generally rectangular in cross section and having concave side walls, one said side wall being swingably mounted to permit expanding and collapsing of the horn, means for feeding to the horn body blanks having hooks at edge portions thereof adapted for interengagement in the formation of side seams, swingably mounted folder wings, means for operating said wings in timed relation for folding blanks about the horn to shape the can bodies and place the hooks in overlapped relation, said wings having convex face portions conforming in shape to and opposing the concave side walls of the horn, means for moving the swingably mounted wall while the hooks are overlapped to expand the horn and cause the hooks to interengage and form a side seam, means for bumping said seam, said wing operating means being timed to move the wing opposed to the swingably mounted wall away from the horn just prior to engagement of the bumping means with the seam while maintaining the other wing in contact, and means carried by said swingably mounted wall opposing wing for holding the blank pressed against said swingably mounted wall while the seam bumping is being performed.

3. In a body maker, a horn generally rectangular in cross section and having concave side walls, one said side wall being swingably mounted to permit expanding and collapsing of the horn, means for feeding to the horn body blanks having hooks at edge portions thereof adapted for interengagement in the formation of side seams, swingably mounted folder wings, means for operating said wings in timed relation for folding blanks about the horn to shape the can bodies and place the hooks in overlapped relation, said wings having convex face portions conforming in shape to and opposing the concave side walls of the horn, means for moving the swingably mounted wall while the hooks are overlapped to expand the horn and cause the hooks to interengage and form a side seam, means for bumping said seam, said wing operating means being timed to move one said wing away from the horn just prior to engagement of the bumping means with the seam while maintaining the other wing in contact, and means for holding the blank pressed against the side of the horn at that side at which said one wing is moved away while the seam bumping is being performed, said last named means including a spring pressed bar carried by said one wing and having a convex outer face conforming in curvature to and opposing the horn wall opposed by said one wing and normally projecting slightly beyond the convex face portion of said one wing for engaging and pressing a blank against said opposing horn wall whenever said one wing is against or close to a blank on said horn.

4. In a body maker, a horn generally rectangular in cross section and having concave side walls, one said side wall being swingably mounted to permit expanding and collapsing of the horn, means for feeding to the horn body blanks having hooks at edge portions thereof adapted for interengagement in the formation of side seams, swingably mounted folder wings, means for operating said wings in timed relation for folding blanks about the horn to shape the can bodies and place the hooks in overlapped relation, said wings having convex face portions conforming in shape to and opposing the concave side walls of the horn, means for moving the swingably mounted wall while the hooks are overlapped to expand the horn and cause the hooks to interengage and form a side seam, means for bumping said seam, said wing operation means being timed to move the wing opposed to the swingably mounted wall away from the horn just prior to engagement of the bumping means with the seam while maintaining the other wing in contact, and means carried by said swingably mounted wall opposing wing for holding the blank pressed against said swingably mounted wall while the seam bumping is being performed, said last named means including a spring pressed bar having a convex outer face conforming in curvature to and opposing the swingably mounted horn wall and normally projecting slightly beyond the convex face portion of the wing carrying the same for engaging and pressing a blank against said swingably mounted horn wall whenever said carrying wing is against or close to a blank on said horn.

5. In a body maker, a horn generally rectangular in cross section and having concave side walls, means for feeding to said horn body blanks having hooks at edge portions thereof adapted for interengagement in the formation of side seams, folder wings for folding blanks about the horn to shape the can bodies and place the hooks in overlapped relation, opposing surfaces of said horn and wings conforming in shape and said horn including an expanding side wall portion, means for expanding the horn while the hooks are overlapped to cause them to interengage and form a side seam, means for bumping the seam, and means yieldably mounted on the wing disposed for cooperation with the expanding side wall portion of the horn and effective during the bumping of the seam for holding the blank against the concave wall of said expanding side wall portion.

6. In a body maker, a horn generally rectangular in cross section and having concave side walls, means for feeding to said horn body blanks having hooks at edge portions thereof adapted for interengagement in the formation of side seams, folder wings for folding blanks about the horn to shape the can bodies and place the hooks in overlapped relation, opposing surfaces of said horn and wings conforming in shape and said horn including an expanding side wall portion, means for expanding the horn while the hooks are overlapped to cause them to interengage and form a side seam, a rigid presser bar conforming in shape to the concave expanding side wall portion which it opposes, said presser bar being floatably mounted on the folder wing which is opposed to said expanding side wall portion, and spring means yieldably pressing said bar toward said expanding side wall portion.

7. In a body maker, a horn generally rectangular in cross section and having concave side walls, means for feeding to said horn body blanks having hooks at edge portions thereof adapted for interengagement in the formation of side seams, folder wings for folding blanks about the horn to shape the can bodies and place the hooks in overlapped relation, opposing surfaces of said horn and wings conforming in shape and said horn including an expanding side wall portion, means for expanding the horn while the hooks are overlapped to cause them to interengage and form a side seam, means for bumping the seam, a presser bar conforming in shape to the concave expanding side wall portion which it opposes, said presser bar being floatably mounted on the folder wing which is opposed to said expanding side wall portion, spring means yieldably pressing said bar toward said expanding side wall portion, and means for moving the folder wings timed to move the last mentioned wing slightly away from the horn during the bumping operation while maintaining contact of the blank by the other wing and by said presser bar.

8. In a body maker, a horn generally rectangular in cross section and having concave side walls, means for feeding to said horn body blanks having hooks at edge portions thereof adapted for interengagement in the formation of side seams, folder wings for folding blanks about the horn to shape the can bodies and place the hooks in overlapped relation, opposing surfaces of said horn and wings conforming in shape and said horn including an expanding side wall portion, means for expanding the horn while the hooks are overlapped to cause them to interengage and form a side seam, means for bumping the seam, a presser bar conforming in shape to the concave expanding side wall portion which it opposes, said presser bar being floatably mounted on the folder wing which is opposed to said expanding side wall portion, spring means yieldably pressing said bar toward said expanding side wall portion, and means for moving the folder wings timed to move the last mentioned wing slightly away from the horn during the bumping operation while maintaining contact of the blank by the other wing and by said presser bar, said last named means including a crank arm associated with each wing, a link connecting each wing to one crank arm, a rock shaft swingably mounting each crank, an actuator arm secured to each rock shaft, a cam shaft, two cams on said cam shaft each having driving connection with one of the actuator arms, and means mounting the cams for individual adjustment about the axis of the cam shaft to permit adjustment of timing of the wings.

PAUL E. PEARSON.
RALPH M. MERO.

REFERENCES CITED

The following references are of record in the file of this patent:

UNITED STATES PATENTS

| Number | Name | Date |
|---|---|---|
| 956,180 | Rudolphi | Apr. 26, 1910 |
| 725,163 | Smith | Apr. 14, 1903 |
| 2,015,987 | Bayer | Oct. 1, 1935 |
| 670,390 | Jensen | Mar. 19, 1901 |
| 577,715 | Brooks | Feb. 23, 1897 |
| 1,143,065 | Perry | June 15, 1915 |
| 442,484 | Jensen | Dec. 9, 1890 |
| 670,390 | Jensen | Mar. 19, 1901 |
| 493,588 | Hume | Mar. 14, 1893 |
| 780,313 | Weinman | Jan. 17, 1905 |
| 1,019,376 | Sleeper | Mar. 5, 1912 |
| 1,569,093 | Kruse | Jan. 12, 1926 |
| 1,153,454 | Sharp | Sept. 14, 1915 |
| 828,723 | Dugan | Aug. 14, 1906 |
| 216,434 | Miller | June 10, 1879 |
| 1,526,827 | Boucher | Feb. 17, 1925 |
| 1,050,516 | Brigel | Jan. 14, 1913 |
| 665,088 | Gould | Jan. 1, 1901 |
| 1,046,088 | Kruse | Dec. 3, 1912 |
| 1,694,387 | Kruse | Dec. 11, 1920 |
| 2,068,264 | Burns | Jan. 19, 1937 |
| 2,277,519 | Laxo | Mar. 24, 1942 |
| 963,603 | Lunceford | July 5, 1910 |

FOREIGN PATENTS

| Number | Country | Date |
|---|---|---|
| 471,534 | Germany | Feb. 14, 1929 |